O. C. STEELE.
FOLDING SHADE.
APPLICATION FILED DEC. 30, 1912.
1,084,761. Patented Jan. 20, 1914.
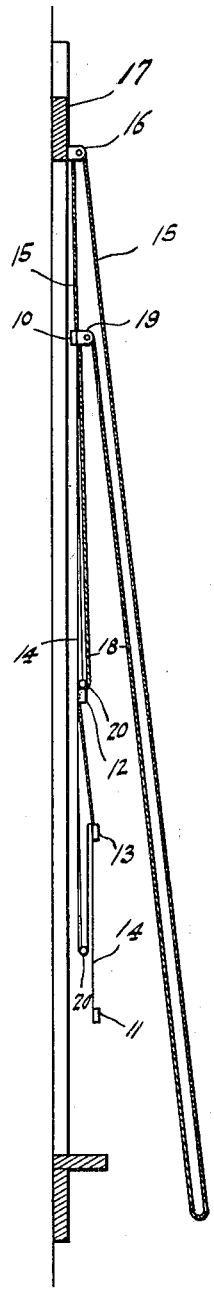
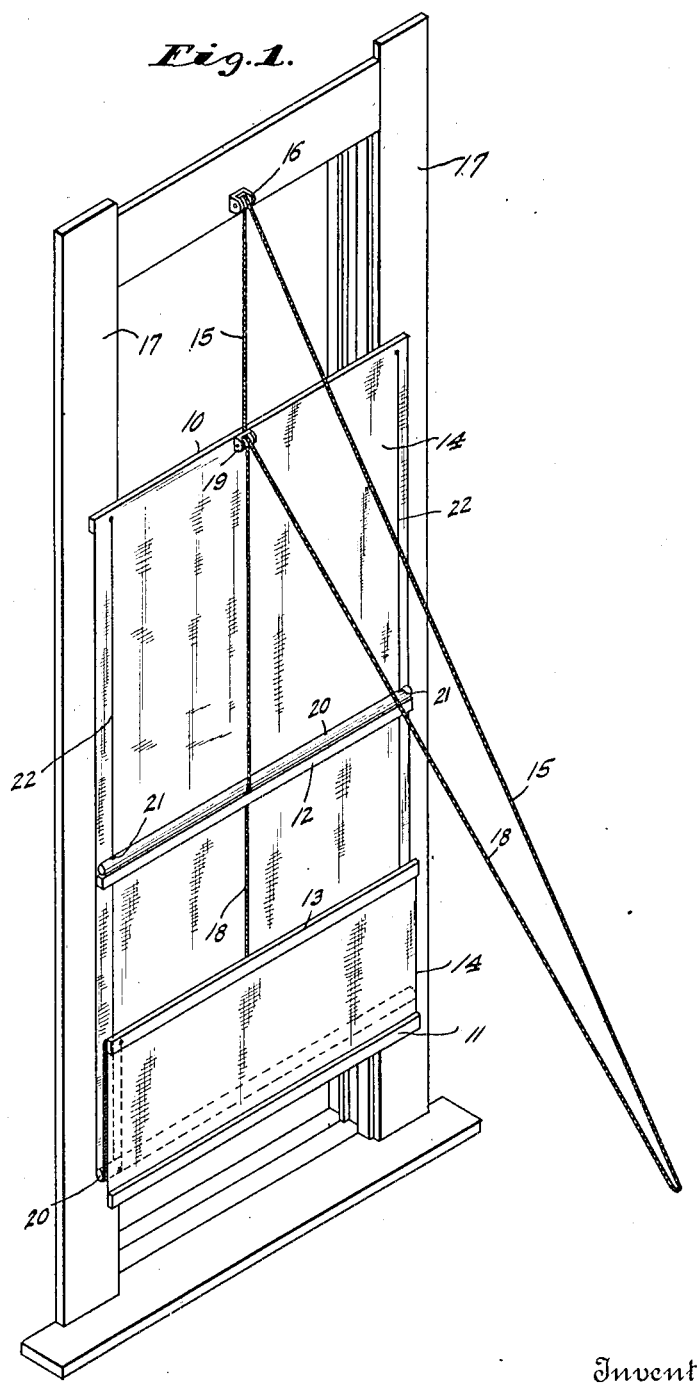
Witnesses
Frank A. Fahle
Josephine Gasper
Inventor
Oliver C. Steele,
By
Arthur M. Hood
Attorney
COLUMBIA PLANOGRAPH CO., WASHINGTON, D. C.

UNITED STATES PATENT OFFICE.

OLIVER C. STEELE, OF SPICELAND, INDIANA.

FOLDING SHADE.

1,084,761.  Specification of Letters Patent.  Patented Jan. 20, 1914.

Application filed December 30, 1912. Serial No. 739,229.

*To all whom it may concern:*

Be it known that I, OLIVER C. STEELE, a citizen of the United States, residing at Spiceland, in the county of Henry and State of Indiana, have invented a new and useful Folding Shade, of which the following is a specification.

In manipulating folding shades, it is found that unless considerable care is used the bight of the shade often tends to crumple up, as by catching on the cross bar which is being raised to form the bight or by a buckling of the fabric.

It is the object of my present invention to prevent this crumpling.

The accompanying drawings illustrate my invention.

Figure 1 is a perspective view of a winlow equipped with one of my improved shades; and Fig. 2 is a vertical section through such window frame and shade.

The window shade illustrated is of the form shown in the patent to Bell, No. 904,298, and comprises an upper cross bar 10, a lower cross bar 11, and two intermediate cross bars 12 and 13, all fastened to the fabric 14 forming the curtain proper, the cross bars dividing the curtain into sections. A cord 15 is fastened to the center of the upper cross bar 10 and passes over a clamping pulley 16 on the upper cross bar of the window frame 17. A cord 18 is attached to the center of the cross bar 13 and passes behind the cross bar 12, or between it and the fabric, and thence over a clamping pulley 19 mounted on the front of the cross bar 10. If desired, the cords 15 and 18 may be continuous with each other, as illustrated. By manipulating the cord 15, the curtain as a whole may be adjusted vertically on the window frame 17. By adjusting the cord 18, the cross bars 13 and 12 may be raised or lowered relatively to the cross bar 10 and to each other, the raising of the cross bar 13 forming a bight in the fabric 14 between it and the cross bars 12 and the raising of the cross bar 12 forming a bight between it and the cross bar 10. In forming these bights, the fabric of the curtain has heretofore often caught on the cross bars 12 and 13, crumpling the curtain and making an unsightly appearance. In order to prevent this crumpling, I provide weights 20 which rest in the bottoms of these bights when they are formed and effectually prevent the curtain from crumpling. These weights, in the form shown, comprise rods extending transversely of the curtain behind the cord 18 and just above each of the cross bars 12 and 13 when the curtain is fully extended, these rods 20 conveniently being provided with holes 21 near their ends to permit the passage of slender guide cords 22 which extend along the curtain near the edges and are attached to the cross bars 10 and 13, conveniently passing under the cross bar 12. As the cross bars 13 and 12 are raised relatively to the cross bars 12 and 10, respectively, the rods or weights 20 slide down into and always remain in the bottom of the bights thus formed and thus prevent crumpling of the curtain, the cords 22 serving to prevent any substantial endwise movement of the rods or weights 20. Tendency to crumple is greatest in the top bight because the friction between the fabric and the window frame is greatest there as the shade is raised. It is in some cases unnecessary to place the rod or weights 20 in any other than such top bight.

I claim as my invention:

1. A folding shade which is varied in length by forming a bight in the curtain by variably folding a lower part of the shade over an upper part, and a weight which rests in the bottom of such bight, said weight being slidably mounted so that it can slide to the bottom of the bight as the form of the latter changes.

2. A folding shade which is varied in length by forming a bight in the curtain by variably folding a lower part of the shade over an upper part, and a weight which rests in the bottom of such bight.

3. A shade, comprising a fabric curtain, a plurality of cross bars attached thereto, and a cord whereby said cross bars may be adjusted relatively to each other to form one or more bights in the fabric curtain, in combination with a rod which is slidable along the fabric of the curtain in each bight.

4. A shade, comprising a fabric curtain, a plurality of cross bars attached thereto, a cord whereby said cross bars may be adjusted relatively to each other to form one or more bights in the fabric curtain, in combination with a rod which is slidable along the fabric of the curtain in each bight, and guide cords fastened to the cross bars and slidably attached to said rods.

5. A shade, comprising a fabric curtain, a plurality of cross bars attached thereto, and a cord whereby said cross bars may be adjusted relatively to each other to form one or more bights in the fabric curtain, in combination with a rod which is slidable along the fabric of the curtain in each bight, said cord and the curtain fabric being located on opposite sides of said sliding rod or rods.

6. A shade, comprising a fabric curtain, a plurality of cross bars attached thereto, a cord whereby said cross bars may be adjusted relatively to each other to form one or more bights in the fabric curtain, in combination with a rod which is slidable along the fabric of the curtain in each bight, and guide cords fastened to the cross bars and slidably attached to said rods, said cord and the curtain fabric being located on opposite sides of said sliding rod or rods.

In witness whereof, I have hereunto set my hand and seal at Spiceland, Indiana, this 26 day of December, A. D. one thousand nine hundred and twelve.

OLIVER C. STEELE. [L. S.]

Witnesses:
JESSIE H. BAILY,
H. T. BAILY,
JOHN R. WIGGS.

Copies of this patent may be obtained for five cents each, by addressing the "Commissioner of Patents, Washington, D. C."